United States Patent
Krüger et al.

(10) Patent No.: US 12,290,199 B2
(45) Date of Patent: May 6, 2025

(54) CARTRIDGE RECEPTACLE, CARTRIDGE SYSTEM, BEVERAGE PREPARATION MACHINE, AND METHOD FOR PRODUCING A BEVERAGE

(71) Applicant: FREEZIO AG, Amriswil (CH)

(72) Inventors: Marc Krüger, Bergisch Gladbach (DE); Daniel Fischer, Romanshorn (CH); Günter Empl, Bergisch Gladbach (DE)

(73) Assignee: FREEZIO AG, Amriswil (CH)

( * ) Notice: Subject to any disclaimer, the term of this patent is extended or adjusted under 35 U.S.C. 154(b) by 836 days.

(21) Appl. No.: 16/767,439

(22) PCT Filed: Nov. 26, 2018

(86) PCT No.: PCT/EP2018/082553
§ 371 (c)(1),
(2) Date: May 27, 2020

(87) PCT Pub. No.: WO2019/101997
PCT Pub. Date: May 31, 2019

(65) Prior Publication Data
US 2021/0000289 A1 Jan. 7, 2021

(30) Foreign Application Priority Data
Nov. 27, 2017 (DE) .................. 10 2017 221 214.4

(51) Int. Cl.
*A47J 31/40* (2006.01)
*A47J 31/36* (2006.01)
(Continued)

(52) U.S. Cl.
CPC ......... *A47J 31/407* (2013.01); *A47J 31/3633* (2013.01); *A47J 31/4492* (2013.01); *B67D 1/0046* (2013.01); *B67D 2001/0812* (2013.01)

(58) Field of Classification Search
CPC .. A47J 31/407; A47J 31/3633; A47J 31/4492; B67D 1/0046; B67D 2001/0812;
(Continued)

(56) References Cited

U.S. PATENT DOCUMENTS 869,551 A * 10/1907 Cole ..................... A47F 3/0426
  222/113
1,654,379 A * 12/1927 Matzka ................ B67D 1/0857
  222/130
(Continued)

FOREIGN PATENT DOCUMENTS

CA 2556421 C 1/2013
CA 2935180 A1 7/2015
(Continued)

OTHER PUBLICATIONS

Grounds of Opposition dated Nov. 16, 2022, EP Patent No. 3716823.
(Continued)

*Primary Examiner* — Thor S Campbell
(74) *Attorney, Agent, or Firm* — The Dobrusin Law Firm, P.C.; Daniela M. Thompson-Walters (57) ABSTRACT

What is proposed is a beverage preparation machine for producing a beverage, into which a cartridge system having a cartridge and a cartridge receptacle connected to the cartridge can be inserted, wherein the cartridge comprises a reservoir filled with a beverage substance, wherein the cartridge receptacle has a mixing chamber which can be brought into fluid communication with the reservoir, and a fluid supply line opening into the mixing chamber, wherein the cartridge receptacle comprises a compressed-air connection for blowing compressed air into the reservoir with the aid of a compressed-air line, wherein the beverage preparation machine also has a holding unit, into which the cartridge receptacle connected to the cartridge can be inserted, a fluid source for feeding the fluid into the fluid (Continued)

supply line, and a compressed-air source for blowing compressed air into the compressed-air connection, characterized in that the holding unit has a light element which is designed in such a way that the light element at least partially encloses the cartridge receptacle received in the holding unit.

31 Claims, 3 Drawing Sheets

(51) Int. Cl.
   *A47J 31/44* (2006.01)
   *B67D 1/00* (2006.01)
   *B67D 1/08* (2006.01)

(58) Field of Classification Search
   CPC .. B67D 7/0233; B67D 1/0022; B67D 1/0078; B67D 1/0079; B67D 1/045
   See application file for complete search history.

(56) References Cited

U.S. PATENT DOCUMENTS

| | | | |
|---|---|---|---|
| 1,762,126 A * | 6/1930 | Harry | B67D 1/0857 40/406 |
| 4,314,768 A | 2/1982 | Goglio et al. | |
| 4,323,171 A | 4/1982 | Whorton, III et al. | |
| 4,376,496 A | 3/1983 | Sedam et al. | |
| 4,581,239 A | 4/1986 | Woolman | |
| 4,708,266 A | 11/1987 | Rudick | |
| 4,829,889 A | 5/1989 | Takeuchi | |
| 4,938,387 A | 7/1990 | Kervefors et al. | |
| 5,402,707 A | 4/1995 | Fond | |
| 5,413,152 A * | 5/1995 | Burrows | B67D 3/0032 222/83.5 |
| 5,435,462 A | 7/1995 | Fujii | |
| 5,494,194 A | 2/1996 | Topper et al. | |
| 5,836,482 A | 11/1998 | Ophardt | |
| 5,876,995 A | 3/1999 | Bryan | |
| 5,890,629 A * | 4/1999 | Loew | B67D 3/0035 222/144.5 |
| 5,897,899 A | 4/1999 | Fond | |
| 6,079,315 A | 6/2000 | Beaulieu et al. | |
| 6,655,260 B2 | 12/2003 | Lazaris et al. | |
| 6,971,549 B2 * | 12/2005 | Leifheit | B05B 9/0861 141/330 |
| 7,597,922 B2 | 10/2009 | Cheng | |
| 8,387,828 B2 * | 3/2013 | Moothart | B67D 3/0096 222/113 |
| 8,544,692 B2 * | 10/2013 | Rusch | B67D 1/0007 222/404 |
| 8,596,498 B2 | 12/2013 | Werner | |
| 8,671,628 B2 | 3/2014 | Sighinolfi | |
| 8,807,018 B2 | 9/2014 | Doleac | |
| 8,820,577 B2 * | 9/2014 | Rusch | B67D 1/0007 222/481.5 |
| 10,407,291 B2 * | 9/2019 | Krüger | A47J 31/3628 |
| 11,021,358 B2 | 6/2021 | Kruger | |
| 11,148,926 B2 * | 10/2021 | Krüger | B67D 1/0043 |
| 2002/0007671 A1 | 1/2002 | Lavi | |
| 2002/0078831 A1 | 6/2002 | Cai | |
| 2002/0130140 A1 | 9/2002 | Cote | |
| 2002/0144603 A1 | 10/2002 | Taylor | |
| 2002/0193777 A1 | 12/2002 | Aneas | |
| 2003/0000964 A1 | 1/2003 | Schroeder et al. | |
| 2003/0036725 A1 | 2/2003 | Lavi | |
| 2003/0070554 A1 | 4/2003 | Cortese | |
| 2003/0071058 A1 * | 4/2003 | Studer | A47K 5/12 222/88 |
| 2003/0097314 A1 | 5/2003 | Crisp, III et al. | |
| 2003/0102330 A1 * | 6/2003 | Cote | B67D 1/0021 222/129.1 |
| 2004/0188459 A1 | 9/2004 | Halliday | |
| 2004/0191372 A1 | 9/2004 | Halliday | |
| 2005/0077318 A1 | 4/2005 | Macler | |
| 2005/0151764 A1 * | 7/2005 | Grady | B41J 2/17566 347/7 |
| 2005/0160919 A1 | 7/2005 | Balkau | |
| 2005/0269362 A1 | 12/2005 | Guerrero | |
| 2006/0047250 A1 | 3/2006 | Hickingbotham | |
| 2006/0138177 A1 | 6/2006 | Wauters et al. | |
| 2006/0174769 A1 | 8/2006 | Favre | |
| 2006/0249536 A1 * | 11/2006 | Hartman | B67D 1/0004 222/214 |
| 2007/0175334 A1 | 8/2007 | Halliday | |
| 2007/0199453 A1 | 8/2007 | Rasmussen | |
| 2008/0029541 A1 | 2/2008 | Wallace et al. | |
| 2008/0302252 A1 | 12/2008 | O'Brien | |
| 2009/0145926 A1 * | 6/2009 | Klopfenstein | B67D 1/07 222/383.2 |
| 2009/0183640 A1 | 7/2009 | Ozanne | |
| 2009/0199518 A1 | 8/2009 | Deuber | |
| 2009/0308488 A1 | 12/2009 | Bennett | |
| 2010/0036528 A1 * | 2/2010 | Minard | B67D 1/0078 235/487 |
| 2010/0064899 A1 | 3/2010 | Aardenburg | |
| 2010/0083843 A1 | 4/2010 | Denisart | |
| 2010/0107889 A1 | 5/2010 | Denisart | |
| 2010/0147154 A1 | 6/2010 | De Graaff | |
| 2010/0180774 A1 | 7/2010 | Kollep | |
| 2010/0206177 A1 | 8/2010 | Ricotti | |
| 2010/0282091 A1 | 11/2010 | Doleac | |
| 2010/0288791 A1 * | 11/2010 | Myyrylainen | B67D 1/06 222/113 |
| 2011/0000377 A1 | 1/2011 | Favre | |
| 2011/0110180 A1 | 5/2011 | Snider | |
| 2011/0166910 A1 | 7/2011 | Marina et al. | |
| 2011/0210140 A1 | 9/2011 | Girard | |
| 2012/0052159 A1 | 3/2012 | Doleac | |
| 2012/0090473 A1 | 4/2012 | Deuber | |
| 2012/0121780 A1 | 5/2012 | Lai et al. | |
| 2012/0180671 A1 * | 7/2012 | Baudet | A47J 31/407 220/23.9 |
| 2012/0199011 A1 | 8/2012 | Cheng | |
| 2012/0199227 A1 | 8/2012 | Manser | |
| 2012/0207893 A1 | 8/2012 | Krüger | |
| 2012/0231124 A1 | 9/2012 | Kamerbeek | |
| 2012/0305605 A1 * | 12/2012 | Vassaux | B67D 1/0037 251/129.01 |
| 2013/0055903 A1 | 3/2013 | Deuber | |
| 2013/0061762 A1 | 3/2013 | Carr et al. | |
| 2013/0062366 A1 | 3/2013 | Tansey | |
| 2013/0084376 A1 | 4/2013 | Fischer | |
| 2013/0129870 A1 | 5/2013 | Novak | |
| 2013/0224340 A1 | 8/2013 | BenDavid | |
| 2013/0239817 A1 | 9/2013 | Starr | |
| 2013/0239820 A1 | 9/2013 | Baldo | |
| 2013/0305932 A1 | 11/2013 | Epars | |
| 2013/0340626 A1 | 12/2013 | Oh | |
| 2014/0033934 A1 | 2/2014 | Chou | |
| 2014/0130678 A1 | 5/2014 | Frydman | |
| 2014/0227403 A1 | 8/2014 | Fischer | |
| 2014/0299000 A1 | 10/2014 | Hanneson et al. | |
| 2014/0326750 A1 | 11/2014 | Marina | |
| 2014/0335239 A1 | 11/2014 | Novak | |
| 2014/0338542 A1 | 11/2014 | Smith | |
| 2014/0345472 A1 | 11/2014 | Fritz | |
| 2015/0050392 A1 | 2/2015 | Stonehouse et al. | |
| 2015/0216353 A1 | 8/2015 | Polti | |
| 2015/0238039 A1 | 8/2015 | Fischer | |
| 2015/0266665 A1 | 9/2015 | Flick | |
| 2015/0335197 A1 | 11/2015 | Moon | |
| 2015/0360854 A1 | 12/2015 | Massey | |
| 2015/0374025 A1 | 12/2015 | Evans | |
| 2016/0015205 A1 | 1/2016 | Oh | |
| 2016/0068334 A1 | 3/2016 | Cafaro | |
| 2016/0152409 A1 | 6/2016 | Cafaro | |
| 2016/0272414 A1 | 9/2016 | Roberts | |
| 2016/0297664 A1 * | 10/2016 | Broodryk | B67D 1/0021 |
| 2016/0309948 A1 | 10/2016 | Dees | |
| 2016/0338527 A1 * | 11/2016 | Burrows | A47J 31/56 |
| 2016/0367066 A1 * | 12/2016 | Brandsma | A47J 31/3633 |

(56) References Cited

U.S. PATENT DOCUMENTS

| | | |
|---|---|---|
| 2016/0367070 A1 | 12/2016 | Cable et al. |
| 2017/0135516 A1 | 5/2017 | Fantappie |
| 2018/0257856 A1 | 9/2018 | Oliver |
| 2019/0016579 A1* | 1/2019 | Krüger ............... B65D 85/8043 |
| 2019/0031485 A1 | 1/2019 | Kruger |
| 2019/0127200 A1 | 5/2019 | Kruger |
| 2019/0241421 A1 | 8/2019 | Kruger |
| 2019/0248639 A1 | 8/2019 | Kruger |
| 2021/0000289 A1* | 1/2021 | Krüger ................ B67D 7/0233 |
| 2021/0229874 A1 | 7/2021 | Cafaro |

FOREIGN PATENT DOCUMENTS

| | | |
|---|---|---|
| CN | 104703894 A | 6/2015 |
| CN | 108778070 A | 11/2018 |
| DE | 69210084 T2 | 9/1996 |
| DE | 29825074 U1 | 9/2004 |
| DE | 102005048164 A1 | 3/2007 |
| DE | 102009049945 A1 | 4/2011 |
| DE | 102009052513 A1 | 5/2011 |
| DE | 102012202184 A1 | 8/2013 |
| EP | 0512470 B1 | 4/1996 |
| EP | 1559351 B1 | 1/2005 |
| EP | 1671568 A2 | 6/2006 |
| EP | 1762163 A1 | 3/2007 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2345354 A1 | 7/2011 |
| EP | 2374733 A1 | 10/2011 |
| EP | 2268175 B1 | 5/2013 |
| EP | 2603120 B1 | 6/2013 |
| EP | 2923772 A1 | 9/2015 |
| EP | 2750561 A1 | 3/2017 |
| GB | 1256247 A | 12/1971 |
| GB | 2020631 A | 11/1979 |
| GB | 2033333 A | 5/1980 |
| GB | 2416757 A | 2/2006 |
| JP | 2005211659 | 8/2005 |
| JP | 2006516398 A | 7/2006 |
| JP | 2008021294 A | 1/2008 |
| JP | 2013533070 A | 8/2013 |
| KR | 101219561 B1 | 2/2013 |
| KR | 101431858 B1 | 8/2014 |
| RU | 2346882 C2 | 1/2006 |
| TW | 201200433 A1 | 1/2012 |
| WO | 1996/036556 A1 | 11/1996 |
| WO | 98/05586 A1 | 2/1998 |
| WO | 01/21292 A1 | 3/2001 |
| WO | 2004067386 A | 8/2004 |
| WO | 2004/099060 A2 | 11/2004 |
| WO | 2005/079361 A2 | 9/2005 |
| WO | 2006/005401 A2 | 1/2006 |
| WO | 2007/035820 A2 | 3/2007 |
| WO | 2011/084603 A1 | 7/2011 |
| WO | 2011/138405 A1 | 11/2011 |
| WO | 2012/007293 A1 | 1/2012 |
| WO | 2013/036564 A2 | 3/2013 |
| WO | 2013/119534 A1 | 8/2013 |
| WO | 2013/119543 A1 | 8/2013 |
| WO | 2013114346 A2 | 8/2013 |
| WO | 2013139864 A1 | 9/2013 |
| WO | 2014/011324 A1 | 1/2014 |
| WO | 2014/200481 A1 | 12/2014 |
| WO | 2015056022 A1 | 4/2015 |
| WO | 2015/094774 A1 | 6/2015 |
| WO | 2017/121796 A1 | 7/2017 |

OTHER PUBLICATIONS

International Search Report for International Application PCT/EP2018/082553, mailed on Feb. 12, 2019.

Notification of Refusal for Japanese Patent Application No. 2019-062721, drafted Nov. 26, 2020 and mailed Dec. 1, 2020.

Office Action and Notice of References Cited for U.S. Appl. No. 16/069,752 mailed on Jan. 7, 2021.

* cited by examiner

CARTRIDGE RECEPTACLE, CARTRIDGE SYSTEM, BEVERAGE PREPARATION MACHINE, AND METHOD FOR PRODUCING A BEVERAGE

FIELD

The present disclosure relates to a cartridge receptacle, cartridge system, beverage preparation machine, and method for producing a beverage.

BACKGROUND

The present invention is based on a cartridge system, which can be inserted into a beverage preparation machine, for producing a beverage, in particular a cold beverage, having a cartridge, which has a reservoir filled with a beverage substance, and a cartridge receptacle, which can be reversibly connected to the cartridge and into which the cartridge can be reversibly inserted, and with a cartridge emptying device, which brings about an at least partial transfer of the beverage substance from the reservoir into a mixing chamber.

Such systems are known in principle from the prior art and are used for producing beverages from pre-portioned cartridges. The production of beverages with such systems is extremely convenient for the user, since he only has to insert a cartridge and press a start button. The beverage preparation machine then takes over making the same in a fully automated manner, that is to say in particular that the beverage substance is mixed with a predetermined amount of liquid, in particular cold and carbonated water, and is introduced into a drinking vessel. In this way, mixed beverages in particular can be produced much more easily, quickly and with little effort for the user. The user can in this case select from a large number of different cartridges, so that he can produce different drinks as desired.

A challenge with such systems is to insert the cartridge correctly into the cartridge receptacle. If the user tries to insert cartridges into the cartridge receptacle in a skewed or twisted position, there is the risk that the cartridge, parts of the cartridge receptacle or parts of the cartridge emptying device will be damaged or that beverage substance will run out of the cartridge. Moreover, user satisfaction is increased significantly if the insertion of cartridges is quick and unproblematic.

In the case of solutions to the problem known from the prior art, the user is compelled to insert the cartridge correctly by a special geometrical design of the cartridge and the cartridge receptacle. Especially when there is a restricted view, this can be tricky and unsatisfactory for the user.

SUMMARY

Therefore, it is an object of the present invention to provide a beverage preparation machine, a cartridge system and a method for producing a beverage by inserting the cartridge system into a beverage preparation machine in which the correct positioning of the cartridge into the cartridge receptacle by the user is made easier and possible operating errors are prevented.

This object is achieved by a beverage preparation machine as claimed in claim 1.

DETAILED DESCRIPTION

The according to the invention has the advantage over the prior art that the light element of the holding unit illuminates the region of the holding unit into which the cartridge receptacle is inserted by the user. This makes it much easier for the user to insert the cartridge receptacle correctly into the holding unit. Optimum illumination allows the user to see exactly whether he is inserting the cartridge receptacle into the holding unit as intended. This is particularly advantageous if the beverage preparation machine is installed at locations where there is poor visibility, such as for example discotheques or bars. There especially, the beverage preparation machine is often operated in hectic conditions and operating errors would be likely. The illumination of the holding unit provides quite clear advantages here over the prior art. Good illumination makes it possible for a good visual check to be kept on the insertion of the cartridge receptacle into the holding unit, and consequently significantly less skewing or twisting to occur during the insertion of the cartridge receptacle. In particular, the cartridge receptacles could be provided with reflective markings in such a way as to indicate the correct position of the cartridge receptacle to the user during the insertion of the cartridge receptacle by reflective light effects.

Furthermore, there is the possibility of making the cartridge translucent. The light element then illuminates the cartridge through the cartridge receptacle. This advantageously makes it possible for the user to check the filling level of the beverage substance in the reservoir of the cartridge. Thus, the user can see how much beverage substance is still present and estimate how many beverages he can still produce without first having to change the cartridge.

Furthermore, by lighting up the beverage substance, it is possible to detect changes of the beverage substance. For example, instances of clouding or coagulation in the beverage substance can be detected better, and consequently conclusions as to the storage life of the beverage substance can be drawn. Formation of mold or other contaminants of the beverage substance can be easily established with the illumination of the beverage substance by the light element. A further advantage of the illumination of the cartridge is that of checking the blowing in of the compressed air. When the compressed air rises up through the beverage substance, air bubbles form. The light falling onto the air bubbles through the beverage substance is refracted and reflected at the air bubbles. As a result, it is visually evident from the beverage preparation whether the feeding of compressed air into the reservoir is functioning and whether consequently hygienic operation of the beverage preparation machine is ensured.

Advantageous configurations and developments of the invention can be taken from the dependent claims, and from the description with reference to the drawings.

According to a preferred embodiment of the present invention, it is provided that the light element completely encloses the cartridge receptacle received in the holding unit, the surrounding light element in this case extending in particular within a horizontal plane perpendicular to the longitudinal axis of the cartridge. The complete enclosure of the cartridge receptacle advantageously makes it possible for the light element to illuminate the cartridge receptacle over a full 360°, without any dark places. As a result, the cartridge receptacle is lit up uniformly, and the user has an optimum visual check on the operation of inserting the cartridge receptacle into the holding unit from every angle in relation to the machine. The position of the light element perpendicularly to the longitudinal axis of the cartridge provides a clear visual presentation of the plane for inserting the cartridge receptacle with the main radiating direction of the light element in the direction of the normal to this plane. Since the light element in the preferred embodiment being considered encloses the inserted cartridge receptacle, and consequently lights it up from all sides, the correct direction for inserting the cartridge receptacle into the holding unit is signaled to the user by the light element.

According to a preferred embodiment of the present invention, it is provided that the light element has a plurality of LEDs, in particular LEDs of different colors. LEDs have proven to be advantageous in the design of lighting systems. They can be used flexibly, are durable and inexpensive and have very low power consumption in comparison with other lighting means. Furthermore, LEDs emit only little heat at comparatively high luminous intensities, which is extremely advantageous for their use in the area of the preparation of beverages. Thus, unwanted heating of the beverage to be prepared can be avoided. The fitting of LEDs with different colors proves to be particularly advantageous. Specific mixing of different colors allows operating parameters of the beverage preparation machine to be signaled to the user. Thus, for example, if a cartridge receptacle is wrongly inserted or the filling level of the compressed-air source is low, red light may be emitted by the light element.

According to a preferred embodiment of the present invention, it is provided that the light element comprises a lighting strip and in particular an LED strip. This advantageously makes homogeneous illumination or lighting up of the holding unit, the cartridge receptacle and the cartridge possible. Unwanted casting of shadows can thus be avoided.

According to a preferred embodiment of the present invention, it is provided that the holding unit has a triggering element, in order to transfer a piercing means of the cartridge receptacle from a retracted position into an extended position. In the extended position, a piercing spike is pressed by the piercing means through a sealing means, which seals off the beverage reservoir, and perforates it. In order to allow the beverage reservoir to be sealed off when not in use and to protect the piercing spike from being damaged, when not in use the latter is not pressed by the piercing means through the sealing means, but is retracted in a protected position. For the operation of piercing the sealing element, however, the piercing spike must be extended. For this purpose, the piercing means is extended and displaces the piercing spike into the extended position. The extending of the piercing means is advantageously initiated here by the triggering element of the holding unit. It is ensured by the separation of the triggering element on the holding unit on the one hand and the piercing means with the piercing spike on the cartridge receptacle on the other hand that the piercing spike is only extended when the cartridge receptacle is inserted into the holding unit. Also conceivable would be a geometrical coding of the triggering element, so that the piercing means is only extended when a cartridge receptacle coded in a way corresponding to the coding of the triggering element is inserted. Furthermore, it is possible that the triggering element is positioned such that the piercing means is only extended when the cartridge receptacle is inserted in the holding unit at the correct place. Furthermore, it is possible that the triggering element is designed such that the piercing means is only extended when the cartridge receptacle is not skewed in relation to the intended direction of insertion and/or has not been inserted far enough into the holding device.

According to a preferred embodiment of the present invention, it is provided that the holding unit comprises a fastening flange, which engages in a form-fitting and/or force-fitting manner around the cartridge receptacle during or after the insertion into the holding unit. With the form-fitting and/or force-fitting connection of the holding unit to the cartridge receptacle by way of the fastening flange, it is ensured that the cartridge receptacle fits securely in the holding unit. The fastening flange can absorb and remove forces that act on the cartridge receptacle. Conceivable here are forces that are produced during the operation of the beverage preparation machine, caused for example by the compressed air applied. The fastening flange can however also absorb and remove forces that act on the cartridge receptacle from the outside. This may for example conceivably be nudging by the user. In this way, the correct fit of the cartridge receptacle in the holding unit can be advantageously ensured.

It is preferably provided that the fastening flange is coupled to a manually or motor-operated triggering element, which, for displacing the fastening flange, is provided in such a way that a relative movement between the capsule receptacle and the triggering element in contact with the piercing means is produced, whereby the piercing spike is transferred from the retracted position into the extended position. The cartridge receptacle is therefore moved by the fastening flange against the fixed triggering element, so that the fixed triggering element presses against the piercing spike and moves it from the retracted position into the extended position. As a result, the sealing film is perforated and the beverage production process begins. In this way it is advantageously ensured that the piercing spike is extended whenever the cartridge receptacle is in the position intended for the piercing of the sealing means. This avoids instances of damage to the piercing spike, which could be caused for example by missing the sealing means when piercing or by contact between the piercing spike and the place intended for piercing at an angle not intended for piercing.

It is preferably provided that the triggering element comprises a hand lever for manual actuation of the same, the hand lever preferably being formed rotatably about an axis of rotation substantially parallel to the longitudinal axis of the cartridge. The manual actuation of the triggering element advantageously reduces the force that is necessary for inserting the cartridge receptacle into the holding unit. The piercing of the sealing means with the piercing spike requires a certain amount of force. With the aid of the hand lever, this force can be comfortably and ergonomically applied by the user and does not have to be applied just by inserting the cartridge receptacle into the holding unit. Providing the hand lever rotatably on an axis of rotation that is substantially parallel to the longitudinal axis of the cartridge makes an advantageous mechanical leverage possible on the triggering element during the actuation of the hand lever. The hand lever may furthermore be provided with a nonslip surface and/or shape. This allows the triggering element to be operated in a particularly advantageous way. By providing good mechanical coupling between the user and the triggering element, the latter can be operated with particularly great sensitivity, and so the piercing means can be protected from damage.

It is preferably provided that the triggering element comprises a transmission, which converts a rotary movement of the hand lever about the axis of rotation parallel to the longitudinal axis into a translational movement substantially parallel to the longitudinal axis, and in particular into a raising or lowering of the holding unit and/or the cartridge receptacle. This makes the force transmission from the actuation of the hand lever to the piercing of the sealing means by the piercing spike possible in a particularly advantageous way. The rotary movement of the hand lever leads to a straight relative movement between the sealing means and the piercing spike. There is consequently no skewing during piercing.

According to a preferred embodiment of the present invention, it is provided that the beverage preparation machine has an identifier detector for reading a product identifier on the cartridge and/or the cartridge receptacle, the identifier detector preferably being arranged above and/or behind the holder. Preferably, the product identifier is embedded in a barcode, an RFID code, a QR code, a data matrix code, a color code, a hologram code or the like. Advantageously, automatic reading of the product identifier is thus possible. The identifier detector comprises in particular an optical sensor, for example a CCD camera, which automatically reads the barcode or QR code or data matrix code when the cartridge has been inserted into the beverage preparation machine. Alternatively, the identifier detector comprises a transceiver antenna for automatically reading the RFID codes. Alternatively, it would be conceivable for the product identifier also to be embedded in other automatically readable computer chips. The term QR code includes, within the context of the present invention, in particular any data matrix code. In this regard, the terms QR code and data matrix code are used synonymously. Alternatively or additionally, it would also be conceivable for the product identifier to comprise a barcode, a dot code, a binary code, a Morse code, Braille code (embossed printing) or the like. The code can in this case also be embedded in a three-dimensional structure, for example a relief. The product identifier comprises in particular what is known as the product identification number, in particular a Universal Product Code (UPC), a European Article Number (EAN), a GS1 code, a Global Trade Item Number (GTIN) or the like. In this way, it is not necessary for a new code system to be introduced. In particular, the product identifier is covered by the GS1 standard.

The product identifier serves in particular for indicating the beverage substance that is in the cartridge. During or before the start of the beverage preparation process, the product identifier is read by the identifier detector. In this way, the beverage preparation machine knows which type of cartridge has been inserted into the beverage preparation machine. It is conceivable that an evaluation and control unit of the beverage preparation machine has a multiplicity of pre-stored beverage production programs, which are provided for the preparation of different beverages and differ from one another for example in the delivery amount, delivery time, delivery pauses, temperature, degree of carbonation and/or pressure of the fluid fed in. It is also conceivable that different feeds of compressed air (for example different pressure) are used in different beverage production programs. Each beverage production program is linked with one or more product identifiers. When a cartridge is inserted into the beverage preparation machine, the product identifier on the cartridge is read by the identifier detector and subsequently compared with the pre-stored data. On the basis of the product identifier, a beverage production program is consequently selected from the plurality of pre-stored beverage production programs and subsequently the beverage production process with the selected beverage production program is started. The parameters such as delivery amount, delivery time, delivery pauses, temperature, degree of carbonation and/or pressure of the fluid fed in are prescribed or controlled by the selected beverage production program, in order to achieve optimum results for the beverage to be produced with the respective beverage substance.

It is conceivable that the beverage production process is not started at all, if no product identifier can be identified or the identified product identifier does not match any pre-stored beverage production program. In this way it is prevented that a non-system cartridge that is not certified for operation in the beverage production machine is used in the beverage production machine, and there would consequently be the risk of the beverage production machine being damaged or the user being put at risk, for example due to bursting of the cartridge (if it were intended for operation at lower pressures).

The product identifier is preferably printed or stuck onto the wall of the cartridge or onto the sealing element (in particular the sealing film) for sealing the cartridge opening. In particular, the product identifier is positioned on the cartridge in such a way that the product identifier is arranged within the detection range of the identifier detector of the beverage preparation machine when the cartridge has been inserted into the beverage preparation machine. Alternatively, it would also be conceivable that the product identifier is not arranged on the cartridge, but correspondingly on an outer wall of the cartridge receptacle.

It is also conceivable that the evaluation and control unit of the beverage preparation machine registers which cartridges and/or how many cartridges of a certain type have been used. Preferably, the beverage preparation machine has a communication module, which provides communication between the beverage preparation machine and a central service provider by means of an Internet connection. The central service provider may be for example a server of the producer of the beverage preparation machine that remotely monitors the status of the beverage preparation machine and/or services, monitors and/or possibly repairs the beverage preparation machine. It is conceivable that the central service provider can for example test and possibly update the firmware or software of the beverage preparation machine and/or can restart the beverage preparation machine. It is also conceivable that new beverage production programs are downloaded (if for example new cartridges come onto the market) and/or the parameters such as delivery amount, delivery time, delivery pauses, temperature, degree of carbonation and/or pressure of the fluid fed in are adapted. Preferably, the beverage production machine has a plurality of sensors which can be read by the central service provider, so that for example the degree of contamination, the degree of wear, the state of the filters, the pump pressure and the like can be monitored. It is also conceivable that operating parameters of the beverage preparation machine that allow ascertainment of the number of beverage production processes already carried out are read. It is for example conceivable that the evaluation and control unit transmits to the central service provider data from which it is evident which and how many cartridges of a certain type have been used, so that for example targeted advertising (for example on the display of the beverage production machine) for the preferred beverages can be activated and/or automatic re-orders for the used cartridges can be uploaded. Preferably, the display of the beverage production machine can be used for a re-order of cartridges, which is transmitted by way of the communication module directly to the central service provider. It is also conceivable that voice control of the beverage production machine is implemented, the voice data for controlling the machine being recorded by a microphone of the beverage production machine and then transmitted to the central service provider by way of the communication module for evaluation of the data. It is also conceivable that the beverage production machine provides a user-sensitive operating mode, with for example personalized menus or settings, which for example comprise individually selected parameters or beverage production programs, the user selection taking place on the basis of a password or biometric data, such as facial recognition, an ins scan or a fingerprint. The data acquired are transmitted, in particular in encoded form, to the central service provider or are evaluated there for authorization or transmission of the personalized menu to the corresponding beverage production machine. It is conceivable that the user can always consequently automatically load his individual menu and/or his individual settings at different beverage production machines.

It is preferably provided that the light element is formed, arranged and/or aligned in such a way that a cone of light emanating from the light element illuminates a detection area of the identifier detector, and in particular the product identifier formed on the cartridge and/or the cartridge receptacle. The product identifier may be an identifier that can be read optically. In order to actively assist the optical reading in an advantageous way, the light element in this case illuminates the product identifier to be read. This reduces errors and disturbances in the reading, in particular when light conditions are otherwise poor.

According to a preferred embodiment of the present invention, it is provided that the light element is formed, arranged and/or aligned in such a way that a cone of light emanating from the light element illuminates the cartridge, and in particular the reservoir. This advantageously makes it possible for the user to keep a check on the inserted cartridge. Even in otherwise dark surroundings, as are usual for example in discotheques or bars, the user obtains information here on which beverage substance is in the inserted cartridge, information on the filling level of the reservoir or else feedback on the functional state of the compressed-air supply by way of the compressed-air bubbles rising up in the beverage substance. In particular, the manifestation of the compressed air in the form of bubbles in the beverage substance as a check on the compressed-air supply is possible in a particularly advantageous way by shining light from the light element into the reservoir, due to reflection and refraction of the light at the compressed-air bubbles.

According to a preferred embodiment of the present invention, it is provided that the beverage preparation machine has a control unit, which controls the light element according to a product identifier read by the identifier detector. It is conceivable here to display which beverage substance is contained in the reservoir of the inserted cartridge by way of the color of the light emitted by the light element. It is also conceivable to display by way of color or a timed light pulse information concerning an expiry date that has passed, which could be contained in the product identifier. Consequently, it is advantageously made easier for the user to operate the beverage preparation machine, in that he is actively informed optically of the beverage substance used. This prevents the preparation of incorrect or spoiled beverages in poorly illuminated surroundings.

A further subject matter of the present invention for achieving the object stated at the beginning is a system having a beverage preparation machine as claimed in one of claims 1 to 13 and a cartridge system which can be inserted into the holding unit and comprises a cartridge and a cartridge receptacle connected to the cartridge.

According to a preferred embodiment of the present invention, it is provided that the cartridge receptacle comprises a spike guide and a piercing means in the form of a piercing spike displaceably mounted within the spike guide, the piercing spike being displaceable between a retracted position, in which the piercing spike is kept at a distance from a sealing element of the cartridge, and an extended position, in which the piercing spike pierces the sealing element and protrudes into the reservoir, the outer wall of the piercing spike having at least one side channel for conducting the beverage substance in the direction of the mixing chamber when the sealing element has been pierced. It is in this way ensured that the fluid feed does not open out into the reservoir of the cartridge, but into the mixing chamber separate from the reservoir. This prevents back-contamination of the beverage preparation machine by the fluid feed in a way that is effective and can be realized easily and at low cost. For this, the reservoir is not flushed through by the fluid, but instead, according to the present invention, the beverage substance and the fluid enter the mixing chamber separately from one another. The fluid is introduced directly into the mixing chamber, while the beverage substance is transferred into the mixing chamber through the cartridge emptying device and independently of the fluid. For this purpose, the cartridge receptacle according to the invention also has the piercing spike mounted displaceably in the spike guide. The piercing spike is in a retracted position in the initial state of the cartridge receptacle, and can be transferred from the retracted position into the extended position for opening a sealing element of the cartridge. In the extended position, the sealing element is perforated by the piercing spike, so that the beverage substance enters the mixing chamber through the at least one side channel, past the sealing element. Before, the reservoir is sealed, in particular in an air-tight and liquid-tight manner, by means of the sealing element. In this way, easy and reliable opening of a cartridge that was previously sealed in an aroma-tight manner in a beverage preparation machine is made possible. Moreover, it has been found that back-contamination of the beverage preparation machine is prevented in a way that is much more effective in comparison with the prior art, in particular since no positive pressure acting directly on the fluid feed is produced in the reservoir. The forming of the mixing chamber in the cartridge receptacle that can be reversibly inserted into the beverage preparation machine advantageously provides that the mixing chamber is part of the exchangeable cartridge system. In this way, contamination of the beverage preparation machine by the beverage substance is effectively avoided, because only parts of the exchangeable single- or multi-use cartridge system come into contact with the beverage substance.

According to a preferred embodiment of the present invention, it is provided that the piercing spike has an integrated compressed-air line, the compressed-air line extending along the piercing spike from a first end of the piercing spike to a second end of the piercing spike, the compressed-air connection for connection to a compressed-air source being formed at the second end and a compressed-air outlet for blowing compressed air into the reservoir being formed at the first end.

In an advantageous way, three functions are integrated in the piercing spike: 1. The piercing spike perforates the sealing element and thereby opens the cartridge 2. The piercing spike comprises at least one side channel, in order to make it possible for the beverage substance to be transferred into the mixing chamber 3. The piercing spike comprises the integrated compressed-air line, which is a cartridge emptying device, in order to blow compressed air into the reservoir, whereby the beverage substance is forced into the mixing chamber under pressure. Within the context of the present invention, therefore, the cartridge emptying device integrated in the cartridge receptacle initially comprises only a compressed-air line, through which compressed air can be introduced into the reservoir from outside. The cartridge receptacle is formed in such a way that the beverage substance is forced out of the reservoir into the mixing chamber by the compressed air. The compressed air is provided in particular by the beverage preparation machine. It is conceivable that a compressed-air source is coupled directly to the compressed-air connection as soon as the cartridge system is inserted into the beverage preparation machine. This has the advantage that back-contamination in the direction of the beverage preparation machine is effectively avoided, because the cartridge emptying device is immediately under pressure when it is inserted into the cartridge system, and it is thereby prevented that beverage substance migrates in the direction of the compressed-air line, and in particular in the direction of the compressed-air source of the beverage preparation machine. Consequently, starting from the reservoir, the beverage substance can only move in the direction of the mixing chamber.

According to a preferred embodiment of the present invention, it is provided that the piercing spike has a plurality of side channels, each side channel extending parallel to the piercing spike and the side channels each taking the form of a groove that is open on one side, made in the outer surface of the piercing spike. Preferably, the side channels are at least partially formed in a peripheral region of the piercing spike that is toward the rear with respect to the cut surface. This has the advantage that the side channels are arranged on that side of the sealing element perforation on which a cut has been made in the material, and not on the opposite side, on which the cut-off material is still joined onto the remaining sealing element. The beverage substance can consequently flow into the side channels comparatively unhindered.

It is conceivable that the cross section of the side channels and/or the number of side channels is adapted to the viscosity of the beverage substance, so that the side channels control or limit the flow of the beverage substance in the direction of the mixing chamber. In the case of a high viscosity, multiple side channels or side channels with a greater cross section are used, whereas in the case of a lower viscosity fewer side channels or side channels with a smaller cross section are provided. Consequently, for each cartridge there is a matching cartridge receptacle.

According to a preferred embodiment of the present invention, it is provided that the mixing chamber has a beverage outlet, through which the beverage formed by mixing the beverage substance with the fluid is discharged, the cartridge receptacle preferably being formed in such a way that the beverage can be introduced directly into a portable vessel from the beverage outlet. In an advantageous way, consequently, neither the beverage substance nor the beverage made comes into contact with part of the beverage preparation machine, so that almost all (back-) contamination of the beverage preparation machine is prevented. The fluid is fed to the mixing chamber separately. Preferably, the fluid is introduced into the mixing chamber under pressure. The fluid is in particular provided by the beverage preparation machine. It is conceivable that a fluid source is coupled directly to a corresponding fluid connection of the cartridge receptacle as soon as the cartridge system is inserted into the beverage preparation machine. The fluid connection is in this case in fluidic connection with the mixing chamber by way of a fluid line. This has the advantage that back-contamination in the direction of the beverage preparation machine is effectively avoided, because the fluid connection is immediately under pressure when it is inserted into the cartridge system, and it is thereby prevented that beverage substance migrates in the direction of the fluid line, and in particular in the direction of the fluid source of the beverage preparation machine. Consequently, starting from the mixing chamber, the beverage substance and the beverage can only move in the direction of the beverage outlet. In particular, the fluid comprises water, preferably pressurized, cooled and/or carbonated drinking water. It would be conceivable to provide the beverage outlet with a closure, which closes the beverage outlet after use. Thus, dripping of the beverage produced from the beverage outlet could be avoided. It is also conceivable that the beverage outlet is adjustable pivotably and/or in height. In this way, the beverage outlet could be set to the geometry of the portable vessel.

According to a preferred embodiment of the present invention, it is provided that the cartridge has a product identifier, which is in particular embedded in a barcode, an RFID code, a QR code, a data matrix code, a color code or a hologram code. Advantageously, automatic reading of the product identifier is thus possible. The product identifier serves in particular for indicating the beverage substance that is in the cartridge. It is conceivable that operating parameters of the beverage preparation machine, such as for example delivery amount, delivery time, delivery pauses, temperature, degree of carbonation and/or pressure of the fluid fed in and/or of the compressed air fed in, are set on the basis of the product identifier. This takes place in an evaluation and control unit of the beverage preparation machine, which has a multiplicity of pre-stored beverage production programs that differ in the operating parameters of the beverage preparation machine. Each beverage production program is linked with one or more product identifiers. When the cartridge is inserted, the product identifier is read by the identifier detector. The evaluation and control unit then selects the beverage production program corresponding to the product identifier. Optimal operating parameters can be set for each beverage to be produced.

It is also conceivable that the beverage production process is not started at all, if no product identifier can be identified or the identified product identifier does not match any pre-stored beverage production program. In this way it is prevented that a non-system cartridge that is not certified for operation in the beverage production machine is used in the beverage production machine, and there would consequently be the risk of the beverage production machine being damaged or the user being put at risk, for example due to bursting of the cartridge (if it were intended for operation at lower pressures).

The product identifier is preferably printed or stuck onto the wall of the cartridge or onto the sealing element (in particular the sealing film) for sealing the cartridge opening. In particular, the product identifier is positioned on the cartridge in such a way that the product identifier is arranged within the detection range of the identifier detector of the beverage preparation machine when the cartridge has been inserted into the beverage preparation machine. Alternatively, it would also be conceivable that the product identifier is not arranged on the cartridge, but correspondingly on an outer wall of the cartridge receptacle.

A further subject matter of the present invention is a method for producing a beverage with a system of the present teachings comprising the following steps:
  inserting the cartridge system into the holding unit of the beverage preparation machine,
  illuminating the reservoir and/or the product identifier by means of the light element,
  establishing a fluidic connection between a fluid source of the beverage preparation machine and the fluid feed of the cartridge receptacle,
  establishing a compressed-air connection between a compressed-air source of the beverage preparation machine and the compressed-air connection of the cartridge receptacle,
  perforating the sealing element by transferring the piercing spike from the retracted position into the extended position,
  transferring the beverage substance from the reservoir into the mixing chamber by feeding compressed air into the reservoir,
  feeding a fluid into the mixing chamber through the fluid feed and discharging by means of a beverage outlet the beverage made in the mixing chamber by mixing the beverage substance with the fluid.

The method steps set out above should not be taken as an imperative chronological sequence, but can also be performed at the same time or in a different order. Preferably, for example, the actuation of the cartridge emptying device and the feeding in of the fluid are carried out in parallel.

According to a preferred embodiment of the present invention, it is provided that, before establishing the fluidic and/or compressed-air connection and/or before perforating the sealing element, a product identifier is read by the identifier detector and is evaluated and in particular verified by a control unit, the product identifier preferably being illuminated by the light element while it is being read. The reading of the product identifier allows operating parameters, such as for example the temperature or degree of carbonation of the fluid or the operating pressure of the compressed-air connection, to be set. Furthermore, reading of the product identifier allows the identifier detector to detect whether the cartridge is intended for use with the beverage preparation machine. Should this not be the case, the perforation of the sealing means could not take place, and thus the piercing spike could be protected from being damaged, due for example to an unsuitable sealing means. Illumination of the product identifier also makes optical reading easier.

According to a preferred embodiment of the present invention, it is provided that the fluid is cooled and/or carbonated before the feeding into the mixing chamber. In this way, cold beverages and carbonated cold beverages can be produced.

According to a preferred embodiment of the present invention, it is provided that the piercing spike is transferred from the retracted position into the extended position by a triggering element of the beverage preparation machine, the cartridge receptacle preferably being moved against the fixed triggering element in such a way that the piercing spike is transferred from the retracted position into the extended position. In this way, the piercing spike perforates the sealing means. In an advantageous way, the reservoir is consequently automatically opened, so that a transfer of the beverage substance into the mixing chamber can take place. It is conceivable that compressed air and fluid are already introduced into the cartridge receptacle during the opening operation, so that back-contamination of the beverage preparation machine by beverage substance is prevented.

According to a preferred embodiment of the present invention, it is provided that, during or after the insertion of the cartridge system into the holding unit, the cartridge receptacle is engaged around by a fastening flange of the holding unit, and the fastening flange being operated by a manually or motor-operated triggering element and in particular displaced in such a way that a relative movement between the capsule receptacle and the triggering element in contact with the piercing spike is produced, whereby the piercing spike is transferred from the retracted position into the extended position. This advantageously brings about the effect on the one hand that forces that act on the cartridge system, such as for example pressure exerted by the user during the inserting operation, are absorbed and removed by the fastening flange. On the other hand, it brings about the effect that the piercing spike is extended from a protected retracted position into an extended position for perforating the sealing means of the reservoir when the cartridge receptacle is in the correct position. Production of the beverage is started by the perforation of the sealing means.

According to a preferred embodiment of the present invention, it is provided that the light element is only switched on or switched to a certain color or brightness when the cartridge system is inserted into the holding unit or is locked in the holding unit. In this way it is advantageously signaled to the user that the cartridge system has been correctly inserted into the holding unit and the beverage preparation machine is ready for producing beverages. If the light element does not switch on or changes its color or brightness, the user can re-insert the cartridge system and correct the error. Furthermore, energy can thus be saved when it is not in use. It is also conceivable that, before inserting the cartridge system, the light element lights up in such a way as to make correct insertion of the cartridge system easier.

According to a preferred embodiment of the present invention, it is provided that the light element, and in particular the color and/or brightness of the light element, is switched according to the evaluation of the production identifier by the control unit. This makes it possible to signal to the user whether the inserted cartridge is intended for use with the beverage preparation machine. If this is not the case, the user could thus insert a different cartridge, which is intended for use with the beverage preparation machine, and thereby prevent possible damage to the beverage preparation machine. Furthermore, information concerning the type of beverage substance used and/or concerning the operating parameters chosen on the basis of the read product identifier could thus be advantageously communicated to the user.

Further details, features and advantages of the invention emerge from the drawings and from the subsequent description of preferred embodiments on the basis of the drawings. The drawings thereby merely illustrate embodiments of the invention that are given by way of example and do not restrict the essential concept of the invention.

Illustrative Examples

In the various figures, the same parts are always provided with the same designations, and are therefore generally also only referred to or mentioned once in each case.

Figure 1A:
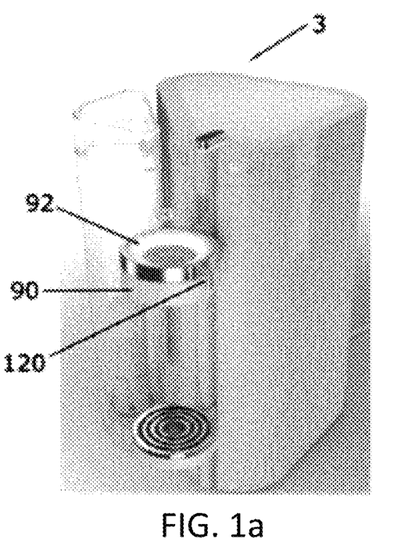
FIGS. 1a and 1b show schematic representations of the beverage preparation machine without an inserted cartridge receptacle according to an embodiment given by way of example of the present invention.
Figure 1B:
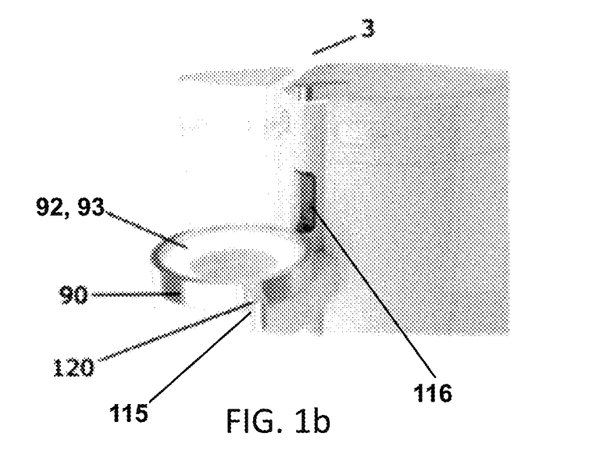

FIGS. 1a and 1b show schematic representations of the beverage preparation machine 3 without an inserted cartridge receptacle 10 according to an embodiment given by way of example of the present invention.

Figure 2:
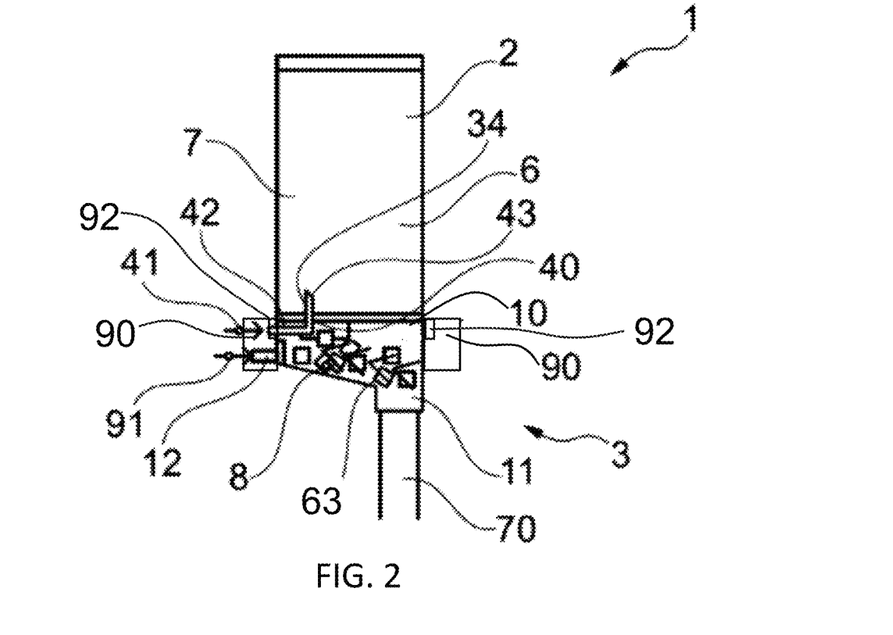
FIG. 2 shows the basic principle of the method for producing a beverage with a cartridge receptacle and a cartridge system inserted into a beverage preparation machine according to an embodiment given by way of example of the present invention.

The beverage preparation machine 3 has a holding unit 90 for receiving a cartridge system 1 (see FIG. 2). The holding unit 90 has a light element 92 for illuminating the cartridge receptacle 10, the cartridge 2 and the reservoir 6 with beverage substance 7. The light element 92 is configured as an LED strip and designed such that it encloses the inserted cartridge receptacle 10. The light element 92 may include a plurality of LEDs 93 which can be in the form of an LED strip. The color and the brightness of the light emitted by the light element 92 are controllable. The holding unit 90 includes a triggering element 115. The triggering element 115 may include a hand lever 120. The hand lever 120 may allow for the manual actuation of the triggering element 115 for extending a piercing spike 73 (such as shown in FIGS. 3b and 3c) of the cartridge receptacle 10 for piercing a sealing means 18 (such as shown in FIGS. 3b and 3c). The hand lever 120 encloses the light element 92 as a ring and is rotatable about the center point axis of the ring. If the user rotates the ring, the triggering element for extending the piercing spike is actuated. An identifier detector 116 is arranged above and/or behind the holding unit 90.

In FIG. 2, a schematic view of a sectional image of a cartridge system 1 according to the invention, which has been inserted into a beverage preparation machine 3 and by means of which a beverage 70 is prepared, is shown in order to illustrate the general functional principle.

The present system comprises the beverage preparation machine 3 (only schematically illustrated), into which exchangeable cartridge systems 1 can be inserted. Each cartridge system 1 has a cartridge 2, which is filled with a certain beverage substance 7, and a cartridge receptacle 10 connected to the cartridge 2. Within the beverage preparation machine 2, with the aid of the beverage substance 7 and an additional water source, referred to hereinafter as fluid source 41, a corresponding beverage 70 is made. The cartridge 2 is in this case preferably filled with a pre-portioned amount of beverage substance 7, which is necessary for making a specific drinking portion, for example the filling of a drinking glass with the desired beverage 70. In particular, a plurality of different cartridge systems 1 are available, the cartridges 2 or reservoirs 6 of which are filled with different beverage substances 7 for making different beverages 70. If the user of the system 1 would like to drink a certain beverage 70, he only needs to select the cartridge system 1 from the multiplicity of different cartridge systems that contains the corresponding beverage substance 7 for making the desired beverage 70, insert it into a holding unit 90 of the beverage preparation machine 3 and possibly start the beverage production process on the beverage preparation machine 3, for example by pressing a start button, correspondingly touching a touch-sensitive display, by gesture or voice control or by means of a suitable app on a cell phone. It is also conceivable that the beverage production process is started automatically when the insertion of a new cartridge system 1 into the holding unit 90 is detected. In each of the aforementioned cases, the desired beverage 70 is then made automatically, introduced into a drinking vessel and thereby provided for the user. Subsequently, the used cartridge system 1 is removed and disposed of. The beverage preparation machine 3 is then ready again to be filled with any desired new cartridge system 1, in order to make a further beverage 70.

The holding unit 90 has a light element 92, which encloses the inserted cartridge receptacle 10. The light radiated by the light element 92 illuminates the cartridge 2, the reservoir 6 and the beverage substance 7. The holding unit 90 and the cartridge system 1 are illuminated during the insertion of the cartridge receptacle 10 in such a way that the user is guided by the radiated light to insert the cartridge receptacle 10 correctly. With the cartridge receptacle 10 inserted, the light element 92 illuminates the reservoir 6 in such a way that the user can detect unwanted changes of the beverage substance 7, such as instances of coagulation or discoloration.

The beverage substance 7 preferably comprises liquid pre-mix ingredients for soft drinks, such as caffeinated, carbonated, fruit- and/or sugar-containing lemonades and juices, (mixed) beer drinks or other alcoholic or non-alcoholic (mixed) drinks.

The cartridge system 1 comprises a cartridge 2 in the form of a cylindrical container with rounded corners. The container is hollow and consequently contains a reservoir 6 for the beverage substance 7. The cartridge 2 is made in particular of plastic and is produced by an injection blow-molding process. The cartridge 2 also has a cartridge opening 63, through which the reservoir 6 is filled with the liquid beverage substance 7. The bottom of the reservoir 6 is formed for example in a funnel-shaped manner, the cartridge opening 63 being arranged at the center of the funnel-shaped bottom. The cartridge 2 is permanently or reversibly connected to a cartridge receptacle 10 according to the invention. The cartridge receptacle 10 is connected onto the cartridge 2 in particular after the filling of the cartridge 2 in the region of the cartridge opening 63 by means of a latching connection 50. For this, the cartridge receptacle 10 has for example lateral latching elements 51 in the form of elastic holding arms or a peripheral latching strip 51 (FIG. 5), which reaches around one or two peripheral holding flanges 52 of the cartridge 2 arranged in the region of the cartridge opening 63. The cartridge receptacle 10 is clipped onto the cartridge 2 after the filling of the cartridge 2.

The cartridge receptacle 10 has a mixing chamber 8, which is in fluidic connection with the reservoir 6 during the beverage production process, so that with the aid of a cartridge emptying device 34 of the cartridge receptacle 10 the beverage substance 7 can be at least partially transferred out of the reservoir 6 into the mixing chamber 8. For this purpose, the cartridge emptying device 34 comprises a compressed-air line 40. One end of the compressed-air line 40 is connected to a compressed-air connection 42, which can be connected to a compressed-air source 41 of the beverage preparation machine 3, in order to introduce compressed air into the compressed-air line 40, while the other end opens out into a compressed-air outlet 43, which is open in the direction of the reservoir 6 and introduces compressed air into the reservoir 6. The introduction of the compressed air brings about the effect that the beverage substance 7 is forced into the mixing chamber 8.

Also opening out into the mixing chamber 8 is a fluid feed 12 of the cartridge receptacle 10, which is fed by a fluid source 91 of the beverage preparation machine 3. It is conceivable that the fluid feed 12 has a quick-action coupling, by which the fluid feed 12 can be connected to the fluid source 91 of the beverage preparation machine 3. The quick-action coupling may be formed for example in such a way that, when the cartridge system 1 is inserted into the holding unit 90, a fluidic connection is automatically established between the fluid source 91 and the mixing chamber 8 via the fluid feed 12. During the beverage production process, fluid, in particular cooled and carbonated drinking water, passes from the fluid feed 12 into the mixing chamber 8 via this fluidic connection. Furthermore, during the beverage production process, beverage substance 7 passes from the reservoir 6 into the mixing chamber 8, as described above. As a result of the beverage substance 7 being mixed with the fluid in the mixing chamber 8, the beverage 70 is formed, which then leaves the mixing chamber 8 through a beverage outlet 11.

The cartridge receptacle 10 has the beverage outlet 11, through which the beverage 70 made within the mixing chamber 8 leaves the mixing chamber 8, and in particular is introduced directly into the drinking vessel (not depicted), i.e. without parts of the beverage preparation machine 3 coming into contact with the beverage 70. In this way, back-contamination of the beverage preparation machine 3 is prevented. The drinking vessel is in particular arranged directly underneath the beverage outlet 11.

Following completion of the beverage production process, the cartridge system 1 is removed from the holding unit 90, so that the beverage production machine 3 can be fitted with a new and unused cartridge system 1. The cartridge receptacle 10 can be reused by being separated from the used cartridge 2 and clipped onto a new cartridge 2.

Figure 3A:
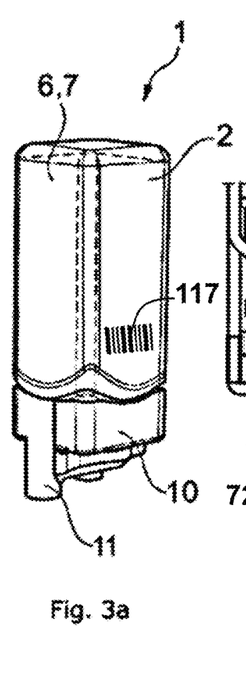
FIGS. 3a to 3c show schematic views of a cartridge receptacle and a cartridge system according to an embodiment given by way of example of the present invention.
Figures 3B, 3C:
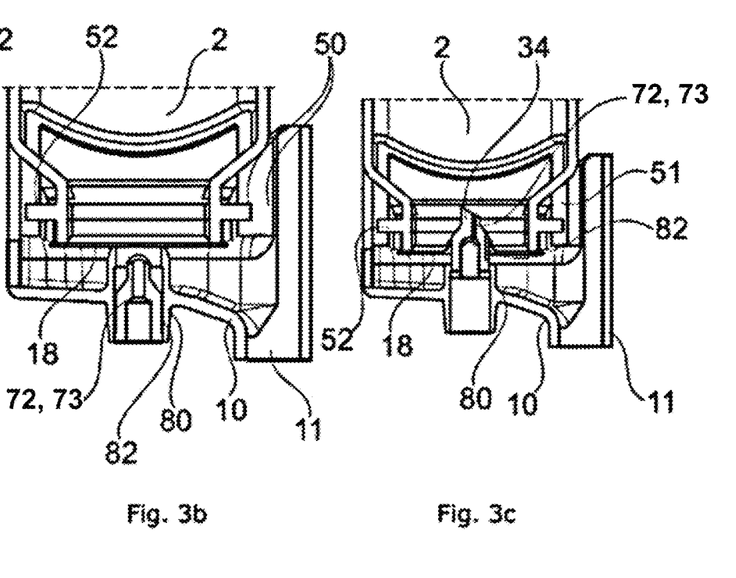

In FIGS. 3a to 3c, schematic views of a cartridge receptacle 10 and a cartridge system 1 according to an embodiment given by way of example of the present invention are illustrated. The cartridge system 1 includes a cartridge 2 and a cartridge receptacle 10. The cartridge 2 includes reservoir 6 which is filled with a beverage substance 7. The cartridge 2 also includes a product identifier 117.

The cartridge receptacle 10 has a spike guide 80, in which a piercing means 72 in the form of a piercing spike 73 is displaceably mounted. The sealing element 18 is perforated by the displaceable piercing spike 73 being transferred between a retracted position, in which the piercing spike 73 is kept at a distance from the sealing element 18 (cf. FIG. 3b), and an extended position, in which the piercing spike 73 pierces the sealing element 18 (cf. FIG. 3c) and protrudes into the cartridge opening 63 or into the reservoir 6.

The outer wall of the piercing spike 73 is provided with the plurality of side channels for conducting the beverage substance 7 from the reservoir 6 in the direction of the mixing chamber 8 when the sealing element 18 has been pierced. The side channels take the form of grooves that are open on one side and run parallel to one another. After the piercing of the sealing element 18, the side channels come into fluidic connection with the reservoir 6, so that the beverage substance 7 can flow around the edges of the pierced sealing element 18 in the direction of the mixing chamber 8.

The cross section of the side channels and/or the number of side channels is in this case preferably adapted to the viscosity of the beverage substance 7, so that the side channels control or limit the flow of the beverage substance 7 in the direction of the mixing chamber 8. In the case of a high viscosity, multiple side channels and/or side channels with a greater cross section are used, whereas in the case of a lower viscosity fewer side channels and/or side channels with a smaller cross section are provided.

Also integrated in the piercing spike 73 is the compressed-air line 40, which acts as a cartridge emptying device 34. The compressed-air line 40 opens out through a fixed compressed-air tip at the end of the piercing spike 73 into the cartridge opening 63 when the piercing spike 73 is in the extended position. The compressed-air tip therefore automatically protrudes into the cartridge opening 63 when the piercing spike 73 has been displaced into the extended position, and as a consequence has pierced the sealing element 18.

On a side of the piercing spike 73 that is in particular remote from the reservoir 6, the compressed-air connection 42 is formed, and is consequently accessible from outside the cartridge receptacle 10 and can be connected to the compressed-air source 41 of the beverage preparation machine 3. Preferably, the piercing spike 73 is transferred from the retracted position into the extended position during or after the insertion of the cartridge system 10 into the beverage preparation machine 3 or after the starting of the beverage production process, preferably by a fixed triggering element of the holding unit 90, against which the piercing spike 73 is pressed.

It is preferably provided that both the fluid source 91 and the compressed-air source 41 are coupled directly to the fluid feed 12 and the compressed-air connection 42, respectively, as soon as the cartridge system 1 is inserted into the beverage preparation machine 3 or a beverage production process is started, and in particular before the sealing element 18 is pierced. In this way, back-contamination in the direction of the beverage preparation machine 3 is effectively avoided, because the fluid feed 12 and the cartridge emptying device 34 are immediately under positive pressure when the cartridge system 1 is inserted, and it is thereby prevented that beverage substance 7 migrates in the direction of the fluid source 91 or the compressed-air source 41. Consequently, starting from the reservoir 6, the beverage substance 7 can only move in the direction of the mixing chamber 8 as soon as the sealing element 18 is opened.

Figure 4:
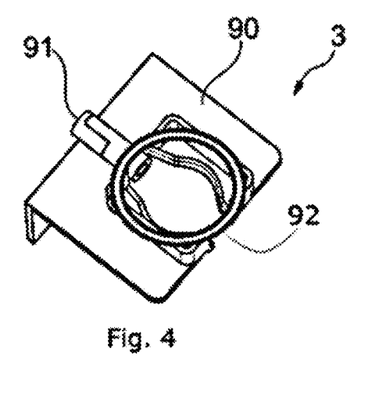
FIG. 4 shows a schematic view of a holding unit of a beverage preparation machine according to an embodiment given by way of example of the present invention.

Shown in FIG. 4 is a view of a detail of the holding unit 90, which consists substantially of a receptacle for the cartridge receptacle 10 and a light element 92, and also comprises a line running to the fluid source 91 of the beverage preparation machine 3 for connection to the fluid feed of the cartridge system 1.

The light element 92, which encloses the cartridge receptacle 10 when the latter is inserted, has a plurality of differently colored LEDs, which are controlled in brightness and color composition according to whether a cartridge receptacle 10 has been inserted.

The holding unit 90 has in particular a fastening flange (not represented), which engages in a form-fitting manner around the cartridge receptacle 10 after the insertion into the holding unit 90. The holding unit 90 can preferably be operated manually, for example by means of an operating lever. If a user actuates the operating lever, the cartridge receptacle 10 is moved in relation to the beverage preparation machine 3 in such a way that the outer end of the piercing spike 73 is pressed against a fixed triggering element (not represented) of the holding unit 90, whereby the piercing spike 73 is moved from the retracted position into the extended position and the sealing element is perforated.

Figure 5:
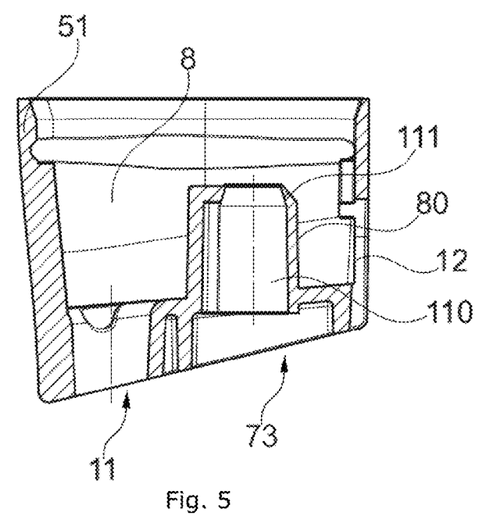
FIG. 5 shows a schematic view of a cartridge receptacle of an embodiment given by way of example of the present invention.

FIG. 5 shows a schematic view of a cartridge receptacle 10 of an embodiment given by way of example of the present invention. The cartridge receptacle 10 has on both sides an at least partially peripheral latching strip 51, with which the cartridge receptacle 10 is clipped onto the holding flanges 52 of the cartridge 2. Furthermore, the cartridge receptacle 10 has a mixing chamber 8, in which the fluid feed 12 is formed on its rearward side in the form of a simple through-opening in the wall of the cartridge receptacle 10. On the front side, the beverage outlet 11 is formed in the bottom of the mixing chamber 8. The bottom of the mixing chamber 8 forms a continuously deepening recess in the direction of the beverage outlet 11, so that, after completion of the beverage production process, no liquid residues remain in the mixing chamber 8. Moreover, in FIG. 5 the spike guide 80 can be seen virtually centrally within the mixing chamber 8.

The spike guide 80 comprises a guide part with an inner guide channel 110, in which the piercing spike 73 is received in a displaceable manner. The guide channel 110 is formed in a substantially cylindrical manner and protrudes virtually perpendicularly from the bottom of the mixing chamber 8 in the direction of the cartridge 2. Formed at an end of the guide part that faces the cartridge 2 is a peripheral stop 111 with a reduced diameter, against which the peripheral shoulder of the piercing spike 73 butts when the piercing spike 73 arrives in the extended position. The stop thus limits the movement of the piercing spike 73 in the direction of the reservoir 6. Optionally, mixing structures are arranged on the bottom of the mixing chamber 8.

For reasons of overall clarity, the piercing spike 73 is not shown in FIG. 5.

LIST OF DESIGNATIONS

1 Cartridge system
2 Cartridge
3 Beverage preparation machine
6 Reservoir
7 Beverage substance
8 Mixing chamber
10 Cartridge receptacle
11 Beverage outlet
12 Fluid feed
18 Sealing element
34 Cartridge emptying device
40 Compressed-air line
41 Compressed-air source
42 Compressed-air connection
43 Compressed-air outlet
50 Latching connection
51 Latching elements/latching strip
52 Holding flange
63 Cartridge opening
70 Beverage
72 Piercing means
73 Piercing spike
80 Spike guide
90 Holding unit
91 Fluid source
92 Light element
93 LEDs
110 Guide channel
111 Stop
115 Triggering element
116 Identifier detector
117 Product identifier
120 Hand lever

The invention claimed is:

1. A beverage preparation machine for producing a beverage, into which a cartridge system comprising a cartridge and a cartridge receptacle connected to the cartridge can be inserted, the beverage preparation machine having:
   a) a holding unit into which the cartridge receptacle connected to the cartridge can be inserted, wherein the cartridge includes a beverage substance, and wherein the cartridge and the cartridge receptacle are removable from the holding unit after the beverage substance is dispensed; and
   b) a light element part of the holding unit, wherein the light element is encircled by an inner perimeter of the holding unit, and wherein the light element is configured such that the light element completely encircles an outer perimeter of the cartridge receptacle received in the holding unit.

2. The beverage preparation machine according to claim 1, wherein the light element completely encircles the outer perimeter of the cartridge receptacle which is received in the holding unit and extends in a horizontal plane perpendicular to a longitudinal axis of the cartridge.

3. The beverage preparation machine according to claim 1, wherein the light element includes a plurality of LEDs of different colors.

4. The beverage preparation machine according to claim 1, wherein the light element includes a lighting strip which is an LED strip.

5. The beverage preparation machine according to claim 1, wherein the cartridge comprises a reservoir filled with the beverage substance; and
   wherein the cartridge receptacle has a mixing chamber, which can be brought into fluidic connection with the reservoir, and a fluid feed, which opens out into the mixing chamber.

6. The beverage preparation machine according to claim 5, wherein the cartridge receptacle comprises a compressed-air connection for blowing compressed air into the reservoir with aid from a compressed-air line.

7. The beverage preparation machine according to claim 6, wherein the beverage preparation machine has a fluid source for feeding a fluid into the fluid feed and a compressed-air source for blowing the compressed air into the compressed-air connection.

8. The beverage preparation machine according to claim 1, wherein the holding unit has a triggering element configured to transfer a piercing means of the cartridge receptacle from a retracted position into an extended position.

9. The beverage preparation machine according to claim 8, the holding unit comprising a fastening flange, which engages in a form-fitting and/or force-fitting manner around the cartridge receptacle during or after the insertion into the holding unit.

10. The beverage preparation machine according to claim 9, wherein the triggering element is manually operated; and
   wherein the fastening flange is coupled to the triggering element, which, for displacing the fastening flange, is provided in such a way that a relative movement between the cartridge receptacle and the triggering element in contact with the piercing means is produced, whereby a piercing spike is transferred from the retracted position into the extended position.

11. The beverage preparation machine according to claim 10, the triggering element comprising a hand lever for manual actuation of the same, the hand lever being formed rotatably about an axis of rotation substantially parallel to a longitudinal axis of the cartridge.

12. The beverage preparation according to claim 1, the beverage preparation machine having an identifier detector for reading a product identifier on the cartridge and/or the cartridge receptacle, the identifier detector being arranged above and/or behind the holding unit.

13. The beverage preparation machine according to claim 12, wherein the light element is formed, arranged and/or aligned in such a way that a light emanating from the light element illuminates a detection area of the identifier detector, and in particular the product identifier formed on the cartridge and/or the cartridge receptacle.

14. The beverage preparation according to claim 1, wherein the light element is formed, arranged and/or aligned in such a way that a light emanating from the light element illuminates the cartridge, including a reservoir of the cartridge.

15. The beverage preparation according to claim 12, wherein the beverage preparation machine has a control unit, which controls the light element according to the product identifier read by the identifier detector.

16. A system having the beverage preparation machine according to claim 1 and the cartridge system which can be inserted into the holding unit and comprises the cartridge and the cartridge receptacle connected to the cartridge.

17. The system according to claim 16, wherein the cartridge receptacle comprises:
   (i) a spike guide; and
   (ii) a piercing means in the form of a piercing spike displaceably mounted within the spike guide,
      wherein the piercing spike is displaceable between a retracted position, in which the piercing spike is kept at a distance from a sealing element of the cartridge, and an extended position, in which the piercing spike pierces the sealing element and protrudes into a reservoir; and
      wherein an outer wall of the piercing spike has at least one side channel for conducting the beverage substance in a direction of a mixing chamber when the sealing element has been pierced.

18. The system according to claim 16, wherein a piercing spike has an integrated compressed-air line, the compressed-air line extending along the piercing spike from a first end of the piercing spike to a second end of the piercing spike; and
   wherein a compressed-air connection for connection to a compressed-air source is formed at the second end and a compressed-air outlet for blowing compressed air into a reservoir is formed at the first end.

19. The system according to claim 16, wherein a piercing spike has a plurality of side channels, each side channel extending parallel to the piercing spike taking a form of a groove that is open on one side, made in an outer surface of the piercing spike.

20. The system according to claim 16, wherein a mixing chamber has a beverage outlet, through which the beverage formed by mixing the beverage substance with a fluid is discharged, and the cartridge receptacle is formed in such a way that the beverage can be introduced directly into a portable vessel from the beverage outlet.

21. The system according to claim 16, wherein the cartridge includes a product identifier, which is embedded in a barcode, an RFID code, a QR code, a data matrix code, a color code, or a hologram code.

22. A method for producing a beverage with the system according to claim 16, comprising the following steps:
   inserting the cartridge system into the holding unit of the beverage preparation machine;
   illuminating a reservoir and/or a product identifier by means of the light element;
   establishing a fluidic connection between a fluid source of the beverage preparation machine and a fluid feed of the cartridge receptacle;
   establishing a compressed-air connection between a compressed-air source of the beverage preparation machine and the compressed-air connection of the cartridge receptacle;
   perforating a sealing element by transferring a piercing spike from a retracted position into an extended position;
   transferring the beverage substance from the reservoir into a mixing chamber by feeding compressed air into the reservoir;
   feeding a fluid into the mixing chamber through the fluid feed; and
   discharging by means of a beverage outlet the beverage made in the mixing chamber by mixing the beverage substance with the fluid.

23. The method according to claim 22, before establishing the fluidic and/or compressed-air connection and/or before perforating the sealing element, a product identifier being read by an identifier detector and evaluated and verified by a control unit, the product identifier being illuminated by the light element while it is being read.

24. The method according to claim 22, the fluid being cooled and/or carbonated before the feeding into the mixing chamber.

25. The method according to claim 22, wherein the piercing spike is transferred from the retracted position into the extended position by a triggering element of the beverage preparation machine; and
   wherein the cartridge receptacle is moved against the triggering element in such a way that the piercing spike is transferred from the retracted position into the extended position.

26. The method according to claim 25, during or after the insertion of the cartridge system into the holding unit, the cartridge receptacle is engaged around by a fastening flange of the holding unit, and the fastening flange being operated by a manually or motor-operated triggering mechanism and in particular displaced in such a way that a relative movement between the cartridge receptacle and the triggering element in contact with the piercing spike is produced, whereby the piercing spike is transferred from the retracted position into the extended position.

27. The method according to claim 22, wherein the light element is only switched on or switched to a certain color or brightness when the cartridge system is inserted into the holding unit or is locked in the holding unit.

28. The method according to claim 22, wherein a color and/or a brightness of the light element is switched according to an evaluation of the product identifier by a control unit.

29. A beverage preparation machine for producing a beverage, into which a cartridge system comprising a cartridge and a cartridge receptacle connected to the cartridge can be inserted, the beverage preparation machine having:
   a) a holding unit into which the cartridge receptacle connected to the cartridge can be inserted; and b) a light element part of the holding unit, wherein the light element is encircled by an inner perimeter of the holding unit, and wherein the light element is configured such that the light element completely encircles an outer perimeter of the cartridge receptacle received in the holding unit;

wherein the cartridge comprises a reservoir filled with a beverage substance;

wherein the cartridge receptacle has a mixing chamber, which can be brought into fluidic connection with the reservoir, and a fluid feed, which opens out into the mixing chamber; and wherein the cartridge receptacle comprises a compressed-air connection for blowing compressed air into the reservoir with air from a compressed-air line.

30. The beverage preparation machine of claim 29, wherein the light element completely encircles the outer perimeter of the cartridge receptacle which is received in the holding unit.

31. The beverage preparation machine of claim 29, wherein the light element includes a lighting strip which is an LED strip.

* * * * *